United States Patent
Wu et al.

(10) Patent No.: US 8,080,963 B2
(45) Date of Patent: Dec. 20, 2011

(54) MOTOR DRIVING CIRCUIT AND MOTOR DRIVING METHOD

(75) Inventors: Yen-Hung Wu, Taoyuan Hsien (TW); Tsung-Jung Hsieh, Taoyuan Hsien (TW); Yueh-Lung Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 599 days.

(21) Appl. No.: 12/241,887

(22) Filed: Sep. 30, 2008

(65) Prior Publication Data

US 2009/0167230 A1 Jul. 2, 2009

(30) Foreign Application Priority Data

Dec. 26, 2007 (TW) ............................. 96150222 A
Dec. 26, 2007 (TW) ............................. 96150226 A

(51) Int. Cl.
*H02P 1/00* (2006.01)
(52) U.S. Cl. ...................... 318/504; 318/283; 318/280
(58) Field of Classification Search ................. 318/504, 318/283, 280, 286, 608, 466, 434, 490; 388/811
See application file for complete search history.

(56) References Cited

U.S. PATENT DOCUMENTS

| | | | | |
|---|---|---|---|---|
| 4,623,939 A | * | 11/1986 | Machida et al. | 369/239 |
| 5,789,891 A | * | 8/1998 | Nakane | 318/626 |
| 6,359,402 B1 | * | 3/2002 | Tyckowski | 318/286 |
| 2008/0112694 A1 | * | 5/2008 | Kang et al. | 388/811 |

\* cited by examiner

*Primary Examiner* — Karen Masih
(74) *Attorney, Agent, or Firm* — Muncy, Geissler, Olds & Lowe, PLLC

(57) ABSTRACT

A motor driving circuit includes a detecting unit, a signal control unit, a comparing unit and a driving unit. The detecting unit detects a rotation speed of a motor and thus outputs a detecting signal. The signal control unit generates a reference signal. The comparing unit electrically connected with the detecting unit and the signal control unit, and receives the detecting signal and the reference signal and thus outputs a comparing signal. The driving unit electrically connected with the comparing unit, and receives the comparing signal and thus outputs a driving signal to drive the motor.

18 Claims, 8 Drawing Sheets

# US 8,080,963 B2

MOTOR DRIVING CIRCUIT AND MOTOR DRIVING METHOD

CROSS REFERENCE TO RELATED APPLICATIONS

This Non-provisional application claims priority under 35 U.S.C. §119(a) on Patent Application No. 096150222, filed in Taiwan, Republic of China on Dec. 26, 2007, and Patent Application No. 096150226, filed in Taiwan, Republic of China on Dec. 26, 2007, the entire contents of which are hereby incorporated by reference.

BACKGROUND OF THE INVENTION

1. Field of Invention

The present invention relates to a motor driving circuit, and in particular to a motor driving circuit capable of providing stable currents or rotation speeds to allow the motor operates stably.

2. Related Art

With the technological progress and development of the computer industry, a portable electronic product such as a notebook computer has gradually become a mainstream in the market. In the portable electronic products, the heat dissipating ability always influences the stability, the performance and the lifetime of the product. For example, a computer system is usually equipped with a fan serving as a heat-dissipating device in order to quickly dissipate the heats generated by the computer system. Thus, the computer system may work under a suitable temperature environment.

Generally speaking, most fans for dissipating heats in the computer systems are driven by brushless DC motors. As shown in FIG. 1, a client system end 6 transmits a pulse width modulation (PWM) signal SPWM to a DC driving circuit 4 so as to drive a motor 5 to rotate by open loop. FIGS. 2A to 2C show motor characteristic curves corresponding to the current, the rotation speed and the air pressure of the conventional motor driving circuit. When the motor 5 works with multiple voltage, the current or rotation speed may be unstable due to different shapes of blades of the motor 5. If the unstable current gets high, electronic elements may be damaged. If the current gets low, the element availability may be wasted. The unstable rotation speed complicates the control of the motor, and the air pressure thereof is also decreased.

SUMMARY OF THE INVENTION

In view of the foregoing, the purpose of the present invention is to provide a motor driving circuit and a motor driving method capable of providing a stable current or driving a motor to operate stably.

To achieve the above, the present invention discloses a motor driving circuit including a detecting unit, a signal control unit, a comparing unit and a driving unit. The detecting unit detects a status of a motor and thus outputs a detecting signal. The signal control unit generates a reference signal. The comparing unit is electrically connected with the detecting unit and the signal control unit. And the comparing unit receives the detecting signal and the reference signal and thus outputting a comparing signal. The driving unit is electrically connected with the comparing unit for receiving the comparing signal and thus outputting a driving signal to drive the motor.

In addition, the present invention also discloses a motor driving method including the following steps of: detecting a status of a motor so as to output a detecting signal; outputting a reference signal; outputting a comparing signal according to the detecting signal and the reference signal; and outputting a driving signal to drive the motor according to the comparing signal. Herein, the status of the motor can be a current, a voltage or a rotation speed, and the detecting signal will correspondingly be a current signal, a voltage signal or a rotation speed signal.

As mentioned above, the detecting unit and the comparing unit are utilized to generate the feedback current, the feedback voltage or the feedback rotation speed for controlling the motor in the present invention. Therefore, the motor is free from being influenced by the multiple voltage, and thus can output stable current, voltage or can operate stably. Accordingly, it is possible to prevent overload of the electrical element, to prevent waste of the availability of the electrical element, and to maintain the working efficiency.

BRIEF DESCRIPTION OF THE DRAWINGS

The present invention will be fully understood from the subsequent detailed description and accompanying drawings, which are given by way of illustration only, and thus are not limitative of the present invention, wherein.

DETAILED DESCRIPTION OF THE INVENTION

The present invention will be apparent from the following detailed description, which proceeds with reference to the accompanying drawings, wherein the same references relate to the same elements.

Figure 1:
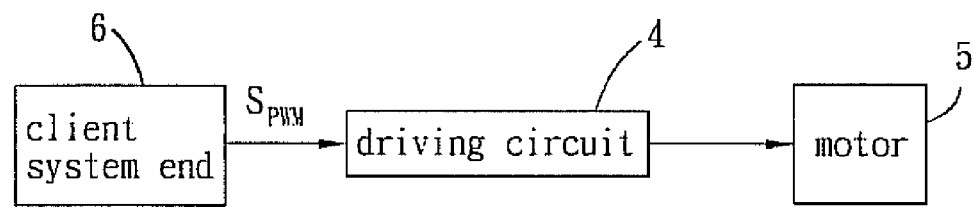
FIG. 1 is a circuit block diagram showing a conventional motor driving circuit.
Figure 2A:
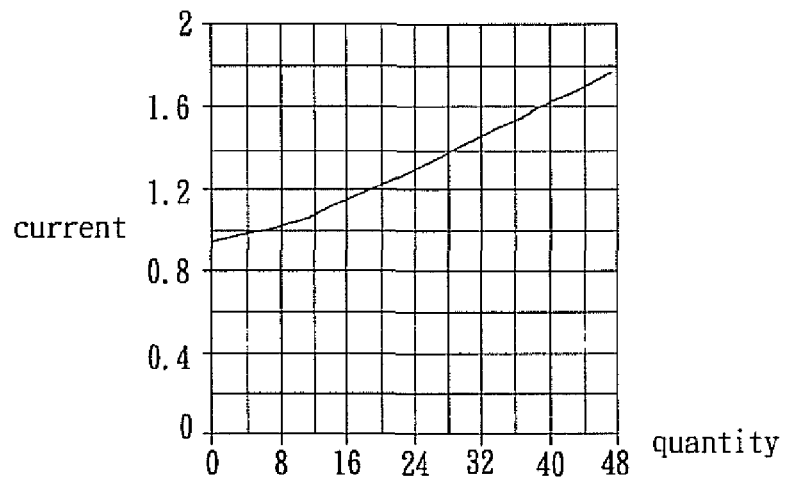
FIGS. 2A to 2C show motor characteristic curves in the conventional motor driving circuit.
Figure 2B:
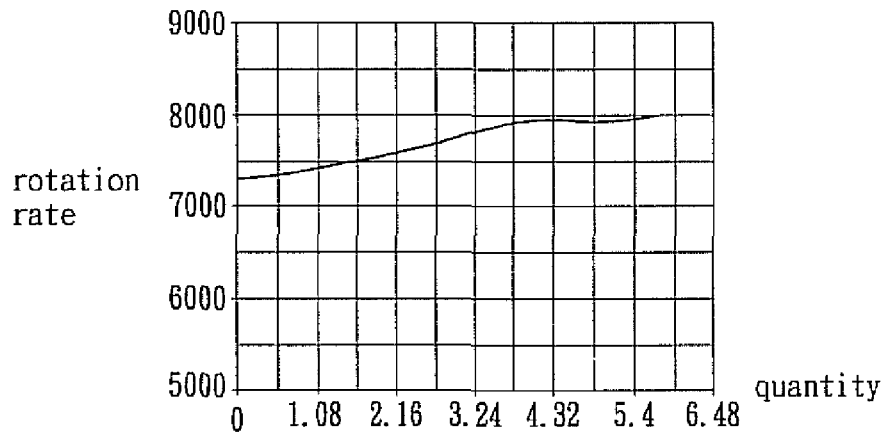
Figure 2C:
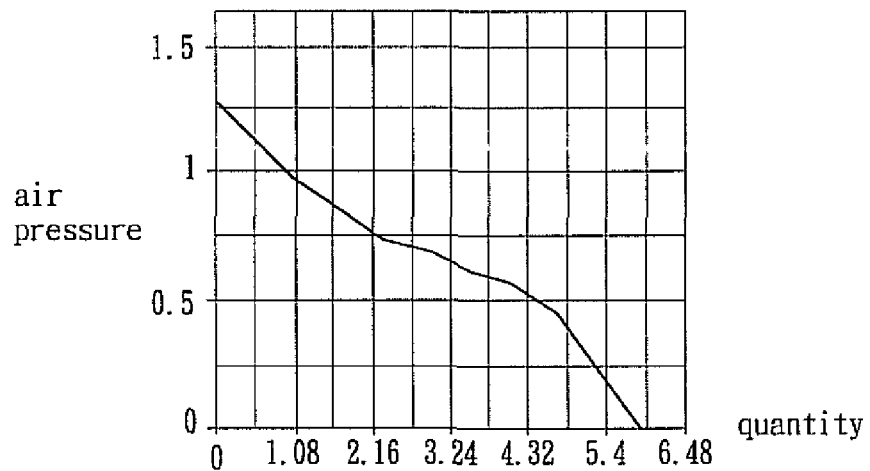
Figure 3:
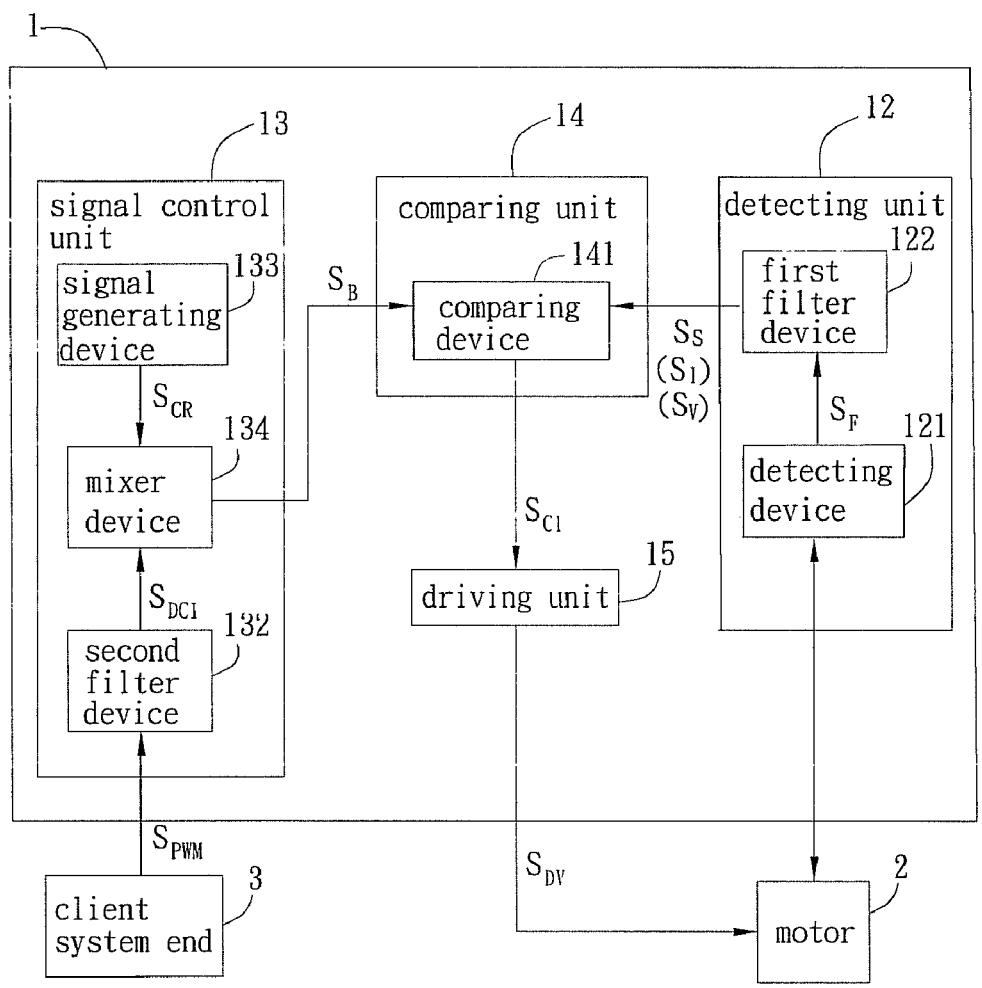
FIG. 3 is a circuit block diagram showing a motor driving circuit according to a first embodiment of the present invention.

Referring to FIG. 3, a motor driving circuit 1 according to the first embodiment of the present invention is used in conjunction with a motor 2. The motor driving circuit 1 includes a detecting unit 12, a signal control unit 13, a comparing unit 14 and a driving unit 15. The motor 2 is, for example but not limited to, a DC brushless motor.

The detecting unit 12 detects a status of the motor 2, which can be a current, a voltage or a rotation speed. And then the detecting unit 12 outputs a detecting signal, which can be a rotation speed signal $S_S$, a current signal $S_I$ or a voltage signal $S_V$. The detecting unit 12 includes a detecting device 121 and a first filter device 122 which is electrically connected with the detecting device 121. In the embodiment, the detecting device 121 can be a current detecting device, a voltage detecting device or a rotation speed detecting device. When the detecting device 121 is the rotation speed detecting device, it detects a rotation speed of the motor 2 and thus outputs a feedback signal $S_F$. The rotation speed detecting device 121 is a tachometer or a Hall element for example. The first filter device 122 electrically connected with the rotation speed detecting device and converts the feedback signal $S_F$ into the rotation speed signal $S_S$. The first filter device 122 can be a frequency-to-voltage integrated circuit (IC) for mainly converting the feedback signal $S_F$ into a DC voltage signal (rotation speed signal $S_S$). And the first filter device 122 includes a capacitor and a resistor.

Figure 4A:
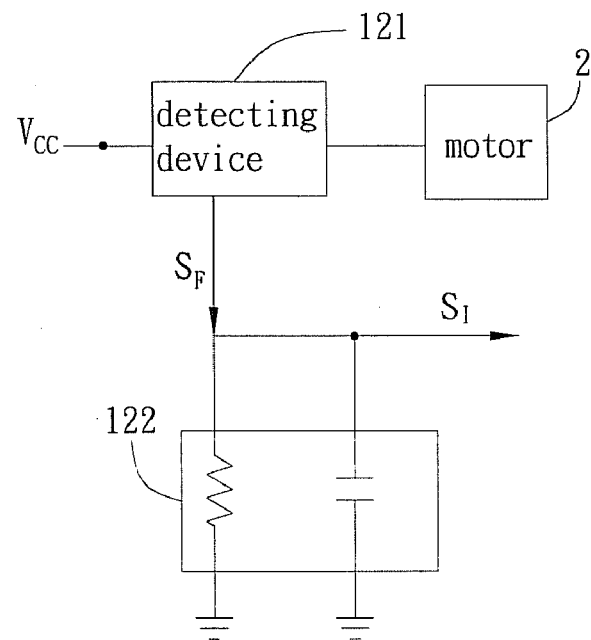
FIG. 4A shows an equivalent circuit diagram of a detecting unit according to the first embodiment of the present invention.
Figure 4B:
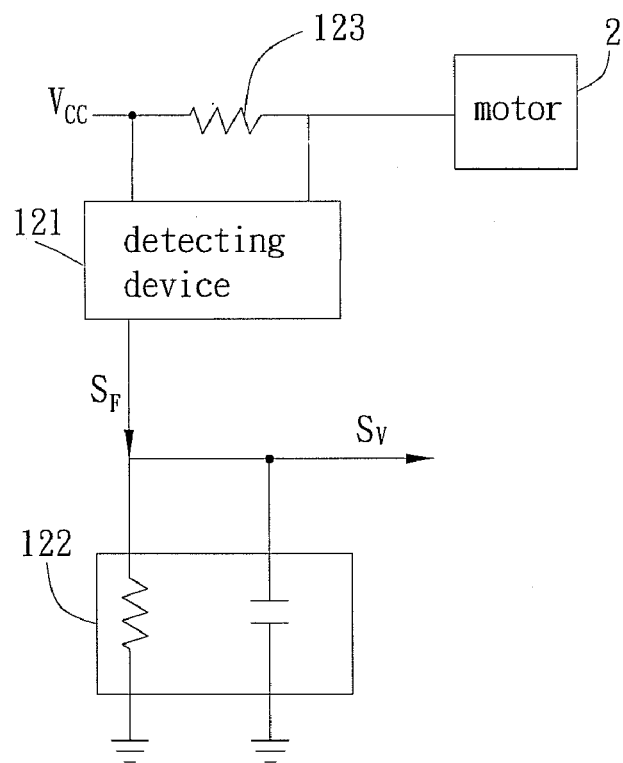
FIG. 4B shows another equivalent circuit diagram of the detecting unit according to the first embodiment of the present invention.

When the detecting device 121 is a current detecting device or a voltage detecting device for detecting a current status or a voltage status of the motor 2, the detecting unit 12 will output the current signal $S_I$ or the voltage signal $S_V$. As shown in FIG. 4A, when the detecting device 121 is a current detecting device, the current detecting device detects a current flowing through the motor 2 and thus outputting the feedback signal $S_F$. The first filter device 122 electrically connected with the current detecting device and converts the feedback signal $S_F$ into the current signal $S_I$, and then outputs the current signal $S_I$ to the comparing unit 14. The current signal $S_I$ is, for example but not limited to, a DC signal. As shown in FIG. 4B, when the detecting device 121 is a voltage detecting device, such as an OP comparator for measuring the voltage on an impedance element 123 in a differential amplification manner and thus outputting a feedback signal, the feedback signal may be converted into the voltage signal $S_V$ by the first filter device 122, and then the first filter device 122 output the voltage signal $S_V$ to the comparing unit 14. The first filter device 122 includes a capacitor and a resistor.

Back to FIG. 3, the signal control unit 13 generates a reference signal $S_B$ and includes a signal generating device 133, a second filter device 132 and a mixer device 134. The second filter device 132 is electrically connected with a client system end 3. The second filter device 132 can receive a pulse width modulation (PWM) signal $S_{PWM}$ transmitted from the client system end 3 and convert the PWM signal $S_{PWM}$ into a DC signal $S_{DCI}$ And the client system end 3 can further change the reference signal $S_B$ by changing a duty cycle of the PWM signal $S_{PWM}$ so as to control the operation of the motor 2.

The mixer device 134 is electrically connected with the second filter device 132 and the signal generating device 133. The signal generating device 133 generates a carrier signal $S_{CR}$ and outputs the carrier signal $S_{CR}$ to the mixer device 134. The mixer device 134 mixes the carrier signal $S_{CR}$ with the DC signal $S_{DCI}$ and then outputs the reference signal $S_B$. The signal generating device 133 is a carrier signal generating circuit for generating the carrier signal $S_{CR}$ having a constant frequency. The frequency of the carrier signal $S_{CR}$ is the same as that of the reference signal $S_B$, but is not necessary to be the same as that of the PWM signal $S_{PWM}$. In addition, the carrier signal $S_{CR}$ can be a triangle wave, a sawtooth wave or a sinusoidal wave. In this embodiment, the carrier signal $S_{CR}$ is a triangle wave.

The comparing unit 14 is electrically connected with the detecting unit 12 and the signal control unit 13, and includes a comparing device 141 for receiving the detecting signal and the reference signal $S_B$ and thus outputting a comparing signal $S_{C1}$ to the driving unit 15. The comparing signal $S_{C1}$, the carrier signal $S_{CR}$ and the reference signal $S_B$ have the same frequency. The comparing device 141 is an OP amplifier, the comparing signal $S_{C1}$ is a pulse width modulation (PWM) signal, and the driving unit 15 is a motor driving integrated circuit (IC).

Figure 5:
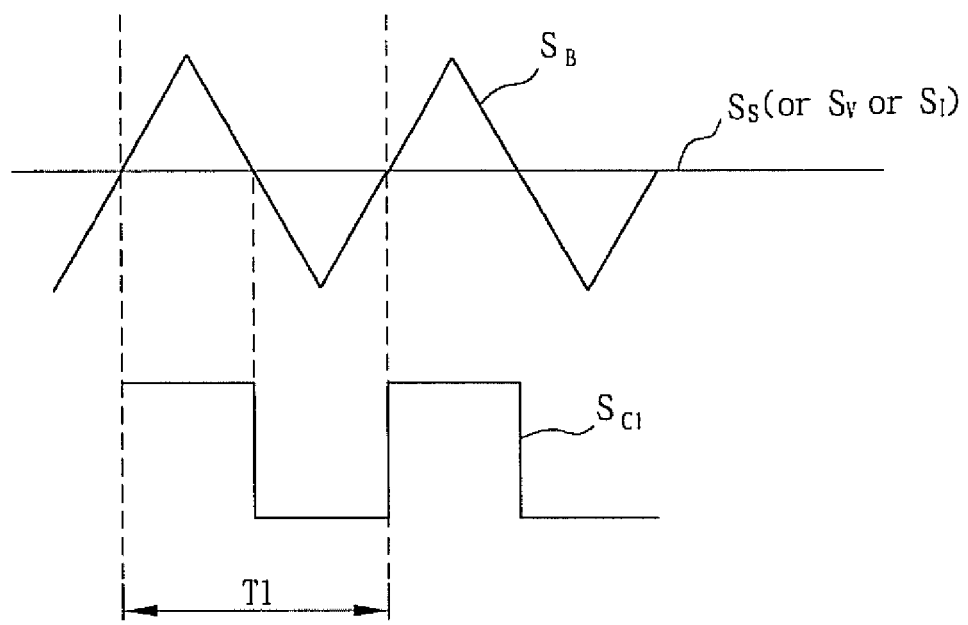
FIG. 5 is a schematic illustration showing an input waveform and an output waveform of a comparing unit in the motor driving circuit according to the first embodiment of the present invention.

The operation of the comparing unit 14 will be described with reference to FIG. 5. When the level of the triangle wave (reference signal $S_B$) is higher than that of the DC signal (detecting signal $S_S$), the comparing device 141 outputs a high-voltage comparing signal $S_{C1}$. When the level of the triangle wave is lower than that of the DC signal, the comparing device 141 outputs a low-voltage comparing signal $S_{C1}$. When the frequency and the duty cycle of the PWM signal $S_{PWM}$ of the client system end are constant, the reference signal $S_B$ will also be a constant signal. And the level of the detecting signal is changed as the status of the motor is changed. Therefore, the duty cycle of the comparing signal $S_{C1}$ will also be changed accordingly so as to control the motor 2. The operation of the comparing unit 14 is described as an illustrative but non-restrictive example, and the comparing method can be reversed according to different comparing units.

The driving unit 15 is electrically connected with the comparing unit 14 and receives the comparing signal $S_{C1}$, and outputs a driving signal $S_{DV}$ to drive the motor 2. When the duty cycle of the comparing signal $S_{C1}$ is increased, the driving signal $S_{DV}$ of the driving unit 15 will drive the motor 2 to increase the rotation speed of the fan which the motor 2 applied to. When the duty cycle of the comparing signal $S_{C1}$ is decreased, the driving signal $S_{DV}$ of the driving unit 15 will drive the motor 2 to decrease the rotation speed of the fan. So, the rotation speed of the fan can be controlled dynamically.

Figure 6:
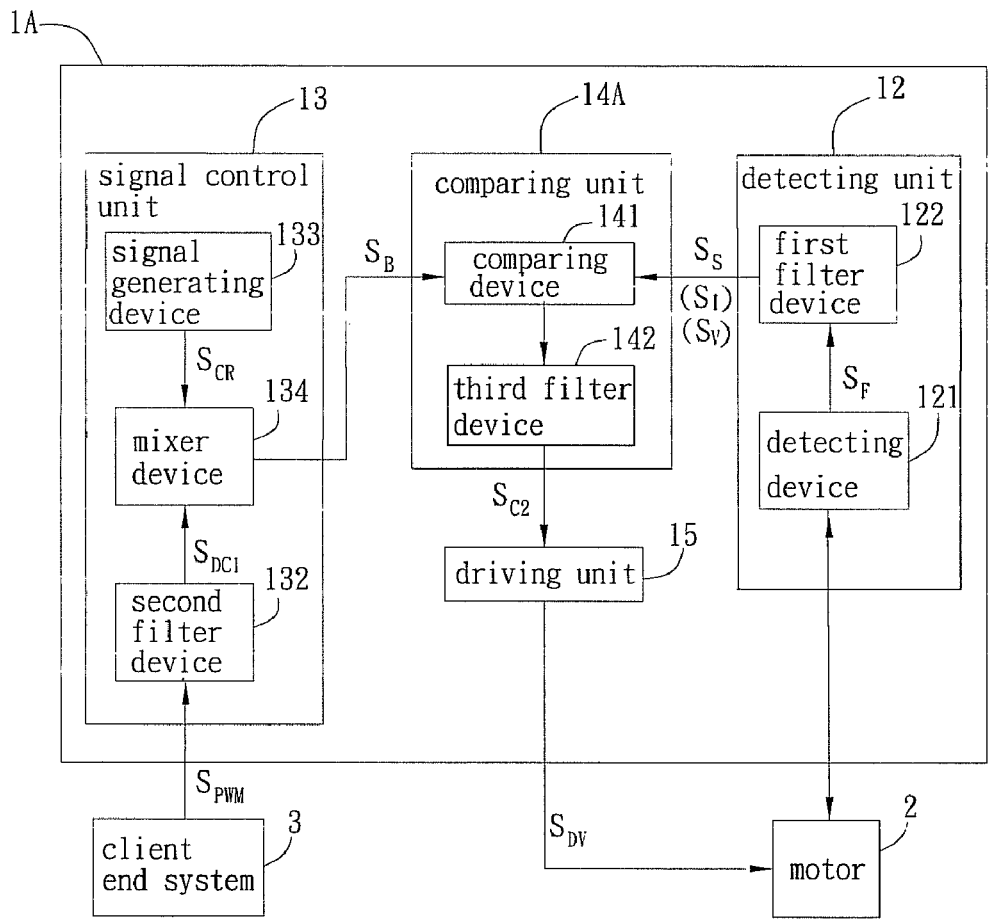
FIG. 6 is a circuit block diagram showing a motor driving circuit according to a second embodiment of the present invention.

In addition, as shown in FIG. 6, a motor driving circuit 1A according to the second embodiment of the present invention differs from the first embodiment in that a comparing unit 14A of the motor driving circuit 1A further includes a third filter device 142 electrically connected with the comparing device 141. The comparing device 141 outputs a PWM signal. And the third filter device 142 converts the PWM signal into a comparing signal $S_{C2}$ and outputs the comparing signal $S_{C2}$ to the driving unit 15. The comparing signal $S_{C2}$ is a DC signal. In addition, when the level of the comparing signal $S_{C2}$ is increased, the comparing signal $S_{C2}$ of the driving unit 15 will drive the motor 2 to increase the rotation speed of the fan which the motor 2 applied to. When the level of the comparing signal $S_{C2}$ is decreased, the comparing signal $S_{C2}$ of the driving unit 15 will drive the motor 2 to decrease the rotation speed of the fan. So, the rotation speed or the current of the fan can be controlled dynamically.

Figure 7:
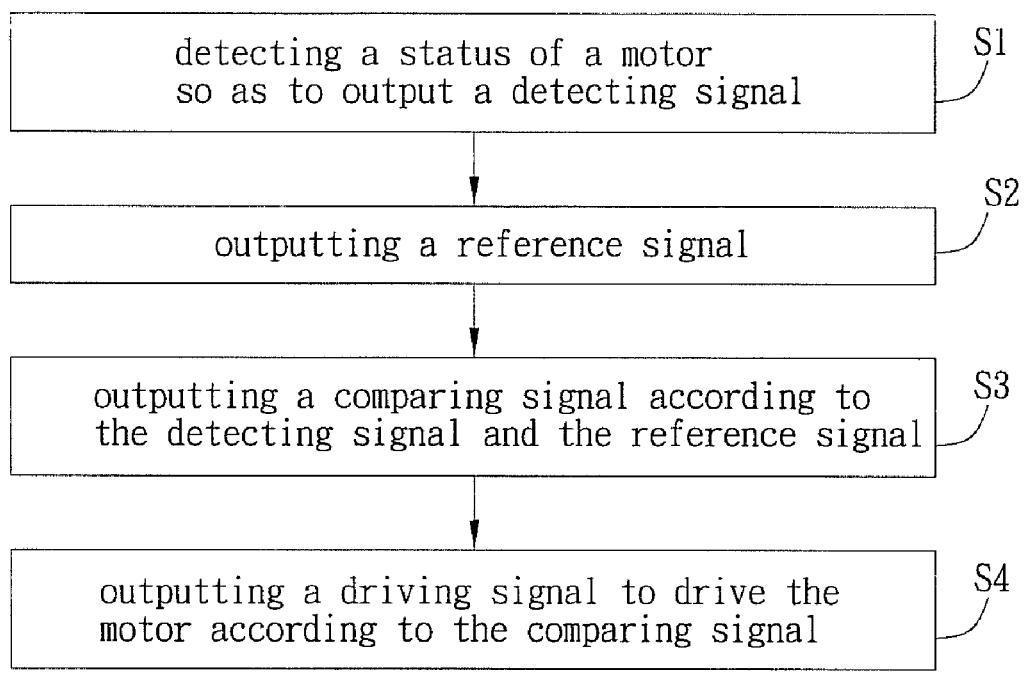
FIG. 7 is a flow chart showing a motor driving method according to the preferred embodiment of the present invention.

Referring to FIG. 7, a motor driving method according to the preferred embodiment of the present invention includes steps S1 to S4.

As shown in FIGS. 3 and 7, the status of the motor 2 is detected by the detecting unit 12 so as to output a detecting signal in step S1. In step S2, a reference signal $S_B$ is outputted by the signal control unit 13. In step S3, a comparing signal $S_{C1}$ is outputted by the comparing unit 14 according to the detecting signal and the reference signal $S_B$. In step S4, a driving signal $S_{DV}$ is outputted by the driving unit 15 to drive the motor 2 according to the comparing signal $S_{C1}$. The motor driving method has been described in detail in the first and second embodiments, so detailed descriptions thereof is omitted. The detecting signal can be the rotation speed signal $S_S$ (FIG. 3), the current signal $S_I$ (FIG. 4A) or the voltage signal $S_V$ (FIG. 4B).

Figure 8A:
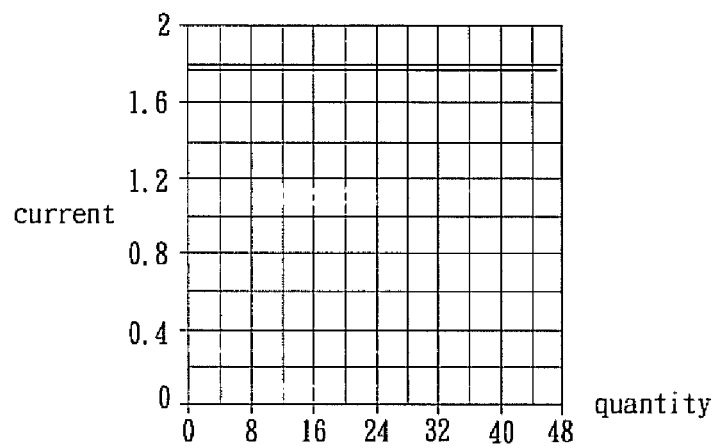
FIGS. 8A to 8C respectively show motor characteristic curves of the motor driving method and the motor driving circuit according to the preferred embodiment of the present invention.
Figure 8B:
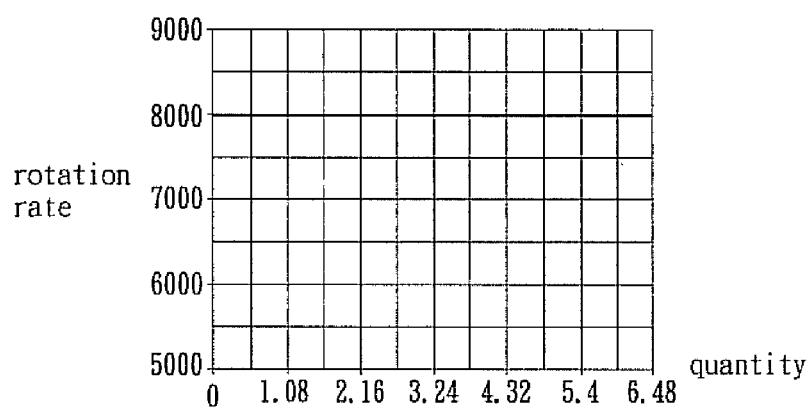
Figure 8C:
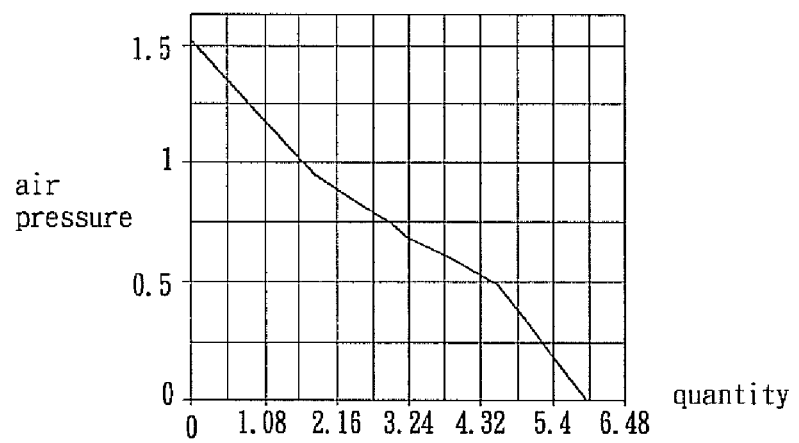

FIGS. 8A to 8C are schematic illustrations showing motor characteristic curves corresponding to the current, the rotation speed and the air pressure, respectively. What deserve to be mentioned is that when the motor operates with a multiple voltage, the detected rotation speed or current is stable in the motor driving circuit and the motor driving method according to the present invention. Comparing with the conventional driving method under the condition that the air flows freely, the present invention can enhance the pressure-quantity (P-Q) property of the motor operates with the multiple voltage.

In the motor driving circuit and the motor driving method according to the present invention, the reference signal with a constant frequency is generated, and then the detecting signal (rotation speed signal, current signal or voltage signal) is compared with the reference signal so as to judge whether the output rotation speed or the output current of the motor is too high or too low, and thus to output the comparing signal to control the rotation speed of the motor. Hence, it is possible to prevent the overload of the electrical element and the waste of the element availability and to maintain the working stability of the motor.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A motor driving circuit connected to a motor, the motor driving circuit comprising:
    a detecting unit for detecting a status of the motor and thus outputting a detecting signal;
    a signal control unit for generating a reference signal;
    a comparing unit electrically connected with the detecting unit and the signal control unit for receiving the detecting signal and the reference signal and thus outputting a comparing signal; and
        a driving unit electrically connected with the comparing unit for receiving the comparing signal and thus outputting a driving signal to drive the motor, and
        the motor driving circuit being connected to a system control end for receiving a pulse width modulation signal transmitted from the system control end, wherein the signal control unit comprises:
            a second filter device electrically connected with the system control end for converting the PWM signal into a DC signal;
            a signal generating device for generating a carrier signal; and
            a mixer device electrically connected with the signal generating device and the second filter device for mixing the carrier signal with the DC signal and then outputting the reference signal.

2. The motor driving circuit according to claim 1, wherein the detecting unit comprises:
    a current detecting device electrically connected with the motor for detecting a current flowing through the motor and generating a current feedback signal for output; and
    a first filter device electrically connected with the current detecting device for converting the current feedback signal into a current signal, wherein the current signal is the detecting signal.

3. The motor driving circuit according to claim 2, wherein the first filter device comprises a capacitor and a resistor.

4. The motor driving circuit according to claim 1, wherein the detecting unit comprises:
    an impedance element electrically connected with the motor;
    a voltage detecting device electrically connected with the impedance element for detecting a voltage on the impedance element and generating a voltage feedback signal for output; and
    a first filter device electrically connected with the voltage detecting device for converting the voltage feedback signal into a voltage signal, wherein the voltage signal is the detecting signal.

5. The motor driving circuit according to claim 4, wherein the voltage detecting device is a comparator, and the first filter device comprises a capacitor and a resistor.

6. The motor driving circuit according to claim 1, wherein the detecting unit comprises:
    a rotation speed detecting device for detecting a rotation speed of the motor and generating a rotation speed feedback signal for output; and
    a first filter device electrically connected with the rotation speed detecting device for converting the rotation speed feedback signal into a rotation speed signal, wherein the rotation speed signal is the detecting signal.

7. The motor driving circuit according to claim 6, wherein the rotation speed detecting device is a tachometer or a Hall element, and the first filter device is a frequency-to-voltage integrated circuit.

8. The motor driving circuit according to claim 1, wherein the detecting signal is a DC signal.

9. The motor driving circuit according to claim 1, wherein the signal generating device is a carrier signal generating circuit, the carrier signal has a constant frequency, and the carrier signal is a triangle wave, a sawtooth wave or a sinusoidal wave, and the comparing signal, the carrier signal and the reference signal have the same frequency.

10. The motor driving circuit according to claim 1, wherein the comparing unit comprises a comparing device for outputting the comparing signal according to the detecting signal and the reference signal, the comparing device is an OP amplifier, and the comparing signal is a pulse width modulation signal.

11. A motor driving circuit connected to a motor, the motor driving circuit comprising:
    a detecting unit for detecting a status of the motor and thus outputting a detecting signal;
    a signal control unit for generating a reference signal;
    a comparing unit electrically connected with the detecting unit and the signal control unit for receiving the detecting signal and the reference signal and thus outputting a comparing signal; and
    a driving unit electrically connected with the comparing unit for receiving the comparing signal and thus outputting a driving signal to drive the motor,
    wherein the comparing unit comprises:
        a comparing device for outputting a pulse width modulation (PWM) signal according to the detecting signal and the reference signal; and
        a third filter device, electrically connected with the comparing device, for converting the pulse width modulation signal into the comparing signal.

12. The motor driving circuit according to claim 11, wherein the comparing device is an OP amplifier, and the comparing signal is a DC signal.

13. The motor driving circuit according to claim 1, wherein the motor is a DC brushless motor and the driving unit is a motor driving integrated circuit.

14. A motor driving method, comprising steps of:
    detecting a status of a motor by a detecting unit so as to output a detecting signal;
    outputting a reference signal by a signal control unit;

outputting a comparing signal according to the detecting signal and the reference signal by a comparing unit; and outputting a driving signal to drive the motor according to the comparing signal by a driving unit;

wherein before the step of outputting the reference signal, the method further comprises the steps of:

receiving a pulse width modulation (PWM) signal from a client system end;

filtering the pulse width modulation signal by a second filter device so as to convert the pulse width modulation signal into a DC signal;

generating a carrier signal by a signal generating device; and mixing the carrier signal with the DC signal by a mixer device to generate the reference signal.

15. The motor driving method according to claim 14, wherein the step of detecting the status of the motor so as to output the detecting signal comprises sub-steps of:

detecting a current flowing through the motor by a current detecting device so as to generate a current feedback signal for output; and filtering the current feedback signal by a first filter device so as to convert the current feedback signal into a current signal, wherein the current signal is the detecting signal.

16. The motor driving method according to claim 14, wherein the step of detecting the status of the motor so as to output the detecting signal comprises sub-steps of:

detecting a voltage on an impedance element by a voltage detecting device so as to generate a voltage feedback signal for output; and filtering the voltage feedback signal by a first filter device so as to convert the voltage feedback signal into a voltage signal, wherein the voltage signal is the detecting signal.

17. The motor driving method according to claim 14, wherein the step of detecting the status of the motor so as to output the detecting signal comprises sub-steps of:

detecting a rotation speed of the motor by a rotation speed detecting device so as to generate a rotation speed feedback signal for output; and filtering the rotation speed feedback signal by a first filter device so as to convert the rotation speed feedback signal into a rotation speed signal, wherein the rotation speed signal is the detecting signal.

18. The motor driving method according to claim 14, wherein the detecting signal is a DC signal.

* * * * *